United States Patent
Okubo et al.

(10) Patent No.: US 7,602,397 B2
(45) Date of Patent: Oct. 13, 2009

(54) IMAGE CREATING DEVICE, LOAD DISPLAY METHOD, RECORDING MEDIUM, AND PROGRAM

(75) Inventors: Takeshi Okubo, Tokyo (JP); Yutaka Ito, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 325 days.

(21) Appl. No.: 11/574,666

(22) PCT Filed: Sep. 5, 2005

(86) PCT No.: PCT/JP2005/016241

§ 371 (c)(1),
(2), (4) Date: Mar. 2, 2007

(87) PCT Pub. No.: WO2006/028046

PCT Pub. Date: Mar. 16, 2006

(65) Prior Publication Data

US 2008/0218529 A1 Sep. 11, 2008

(30) Foreign Application Priority Data

Sep. 9, 2004 (JP) .............................. 2004-262061

(51) Int. Cl.
*G09G 5/00* (2006.01)
(52) U.S. Cl. .............................. 345/581; 463/6; 715/705
(58) Field of Classification Search ........................ None
See application file for complete search history.

(56) References Cited

U.S. PATENT DOCUMENTS 5,657,460 A * 8/1997 Egan et al. .................. 715/763
5,921,780 A * 7/1999 Myers .......................... 434/69

(Continued)

FOREIGN PATENT DOCUMENTS

GB 2 297 674 A 8/1996

(Continued)

OTHER PUBLICATIONS

Supplementary European Search Report for Application No. 05781590.4, PCT/JP2005016241, dated Dec. 19, 2007, 5 pages total.

(Continued)

*Primary Examiner*—Kee M Tung
*Assistant Examiner*—David H Chu
(74) *Attorney, Agent, or Firm*—Townsend and Townsend and Crew LLP

(57) ABSTRACT

An operation input reception unit (201) receives an operation input for a virtual vehicle to be run on the running path. A running condition managing unit (203) manages the running condition of the virtual vehicle based on the received operation input. A load calculation unit (205) calculates a load imposed on a virtual operator in the virtual vehicle, based on the managed running condition. Meanwhile, a symbol drawing unit (401) draws a load symbol whose display position changes according to the calculated load. A tire image drawing unit (402) draws an image of a tire whose display manner changes according to the calculated load. A meter image creating unit (403) creates a meter image including the drawn load symbol and image of the tire. Then, a display control unit (207) displays the created meter image on a predetermined monitor.

7 Claims, 15 Drawing Sheets

U.S. PATENT DOCUMENTS

Figure 1:
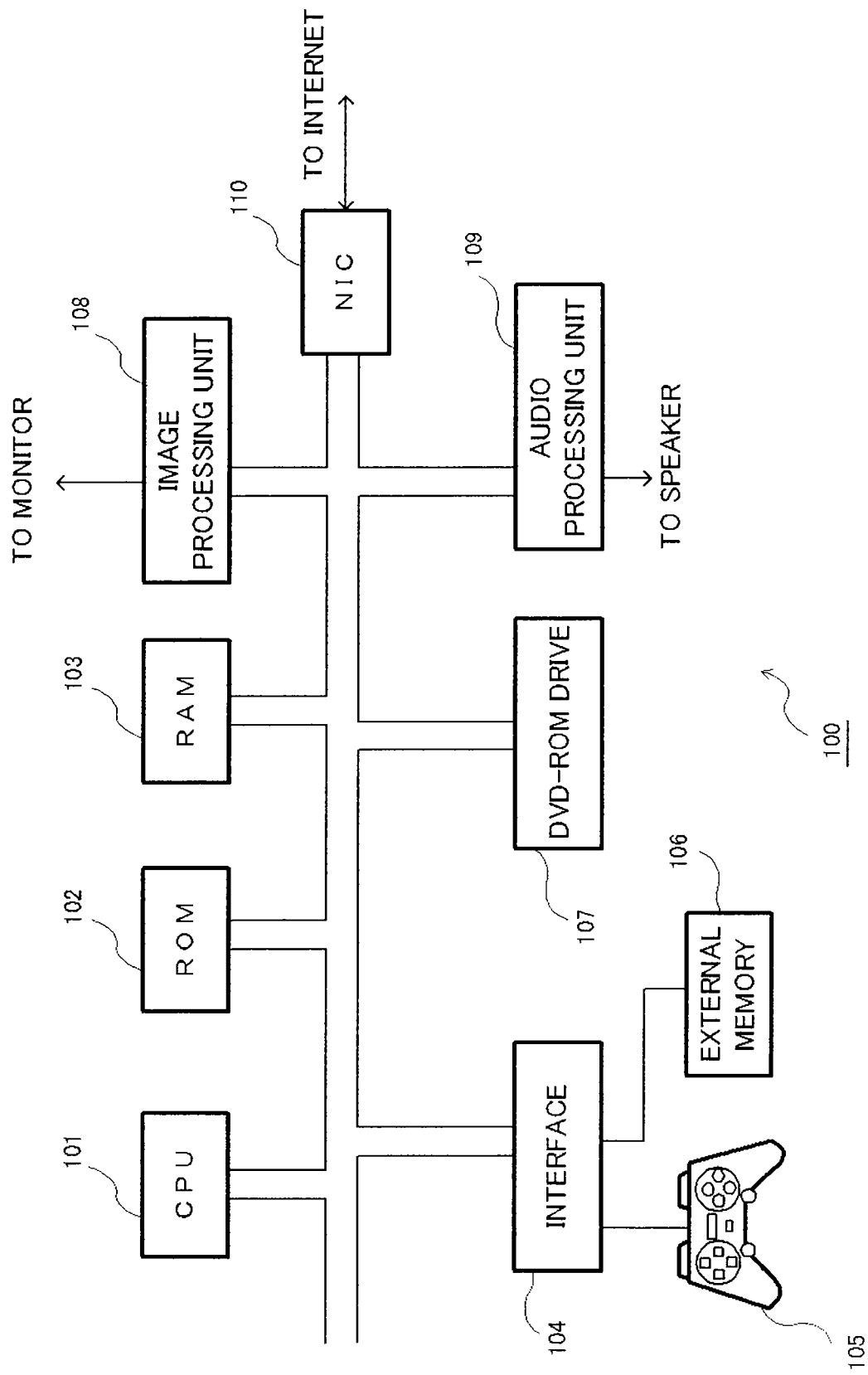

| | | | | |
|---|---|---|---|---|
| 6,171,186 B1 * | 1/2001 | Kurosawa et al. | ............ | 463/31 |
| 2004/0121829 A1 * | 6/2004 | Reed | ............................. | 463/6 |
| 2004/0235543 A1 * | 11/2004 | Eika | ............................. | 463/6 |

FOREIGN PATENT DOCUMENTS

| | | |
|---|---|---|
| JP | 3556660 B1 | 8/2004 |
| WO | WO 01/52958 A | 7/2001 |

OTHER PUBLICATIONS

Enthusia, Dengeki, ""G" Taikan System "VGS" o Tosai!!" Playstation vol. 273, Media Works Inc., Jun. 11, 2004. vol. 10, No. 15, whole No. 269, pp. 254-255.

"Straight Victory ~ Hosino Kazuyoshi heno Chosen~", Shukan Fami Tsu, 5 Gatsu 8, 15 Nichi Gappeigo, Ascii Corp., May 15, 1998, vol. 13, No. 20, whole No. 491, p. 40, TDS Systemtte Nani?.

Kinkyu Sokuho Enthusia, Shukan Fami Tsu, 5 Gatsu 14, 21 Nichi Gappeigo, Enterbrain, Inc., May 21, 2004, vol. 19, No. 21, whole No. 805, pp. 37-39, "Gazo Joho Mansai!! "VGS" System o Tosai".

"Enthusia Professional Racing~", Shukan Fami Tsu, 10 Gatsu 15 Nichigo, Enterbrain, Inc., Oct. 15, 2004,, vol. 19, No. 42, whole No. 826, pp. 214-215, "TGS Version Iko ni VGS ga Henka!".

International Search Report, PCT/JP2005/016241.

* cited by examiner

RUNNING CONDITIONS OF RACING CAR OPERATED BY USER

| CURRENT POSITION | RUNNING DIRECTION | VELOCITY | STEERING ANGLE | ACCELERATING CONDITION | DECELERATING CONDITION | RIGHT TURNING CONDITION | LEFT TURNING CONDITION | ... |
|---|---|---|---|---|---|---|---|---|
| (x1, y1, z1) | (xa, yb, zc) | 250 | 0 | 10 | — | — | — | ... |

FIG. 3A

RUNNING CONDITIONS OF OTHER RACING CARS

| VEHICLE ID | CURRENT POSITION | RUNNING DIRECTION | VELOCITY | STEERING ANGLE | ACCELERATING CONDITION | DECELERATING CONDITION | RIGHT TURNING CONDITION | LEFT TURNING CONDITION | ... |
|---|---|---|---|---|---|---|---|---|---|
| 001 | (x2, y2, z2) | (x2, y2, z3) | 200 | +20 | — | — | 15 | — | ... |
| 002 | (x3, y3, z3) | (x2, y2, z3) | 130 | 0 | — | 20 | — | — | ... |
| 003 | (x4, y4, z4) | (x2, y2, z3) | 110 | −25 | — | — | — | 20 | ... |
| 004 | (x5, y5, z5) | (x2, y2, z3) | 190 | 0 | 20 | — | — | — | ... |

FIG. 3B

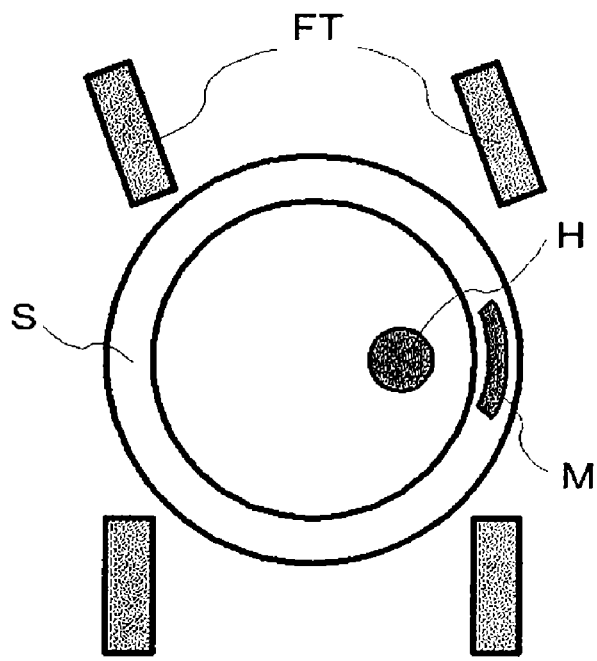
F I G. 5D
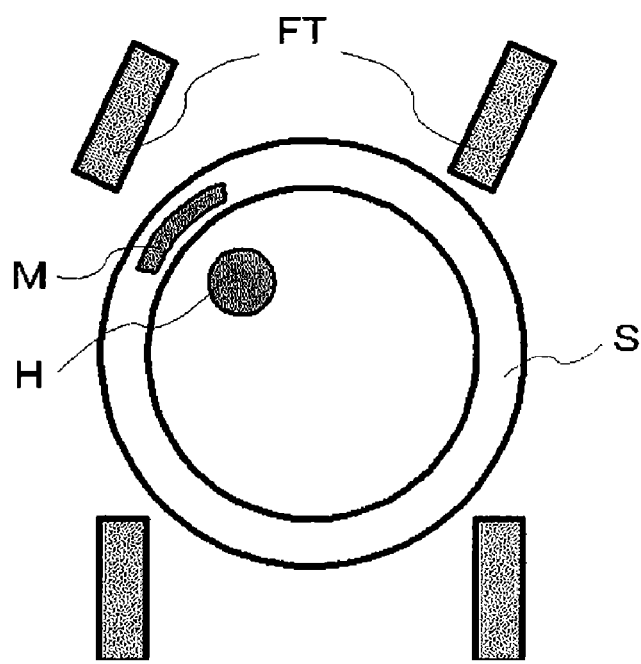
F I G. 5E

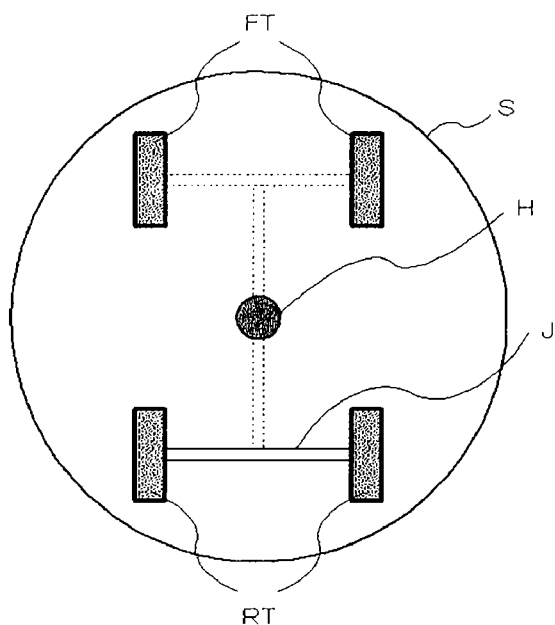
FIG. 9A
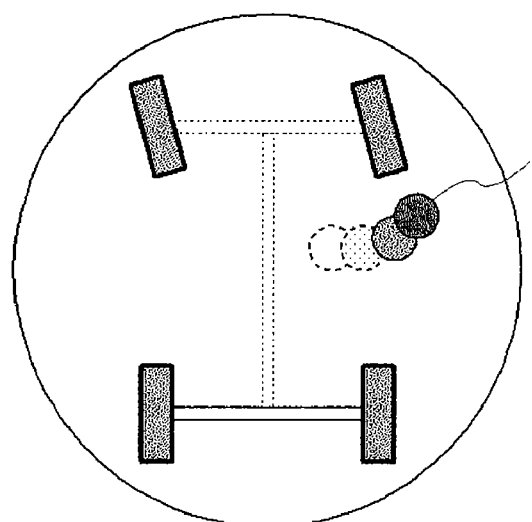 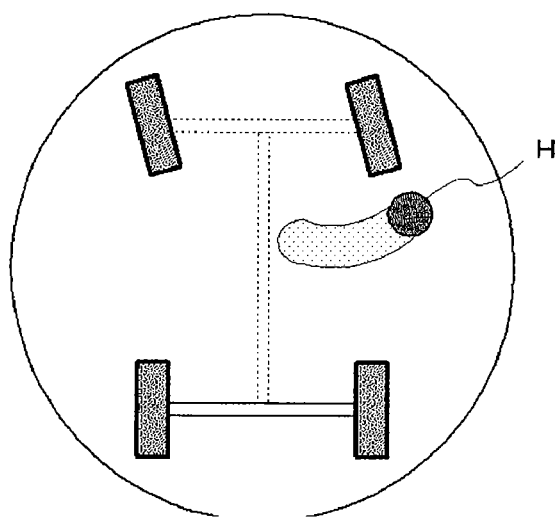
FIG. 9B  FIG. 9C

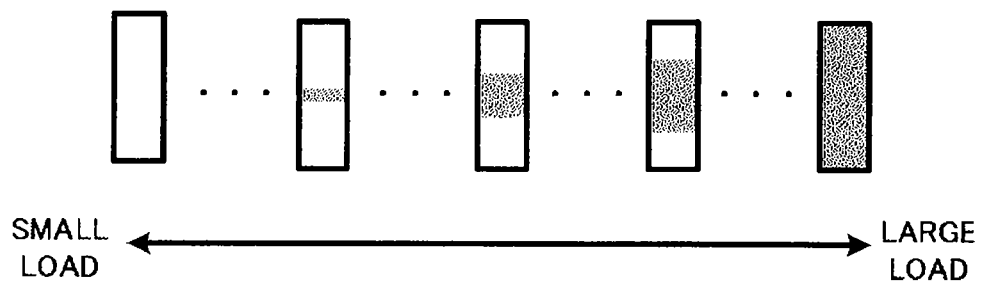
SMALL LOAD ←——————————→ LARGE LOAD
F I G. 11A
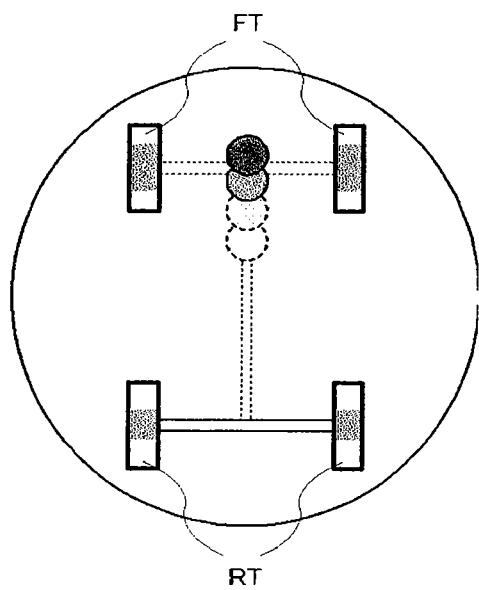
F I G. 11B
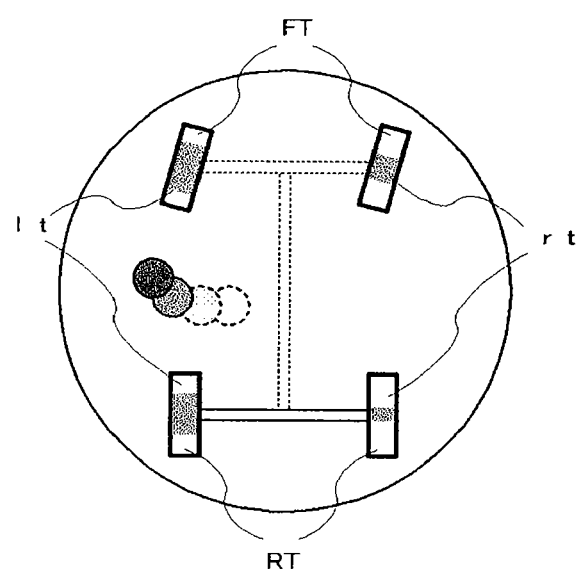
F I G. 11C

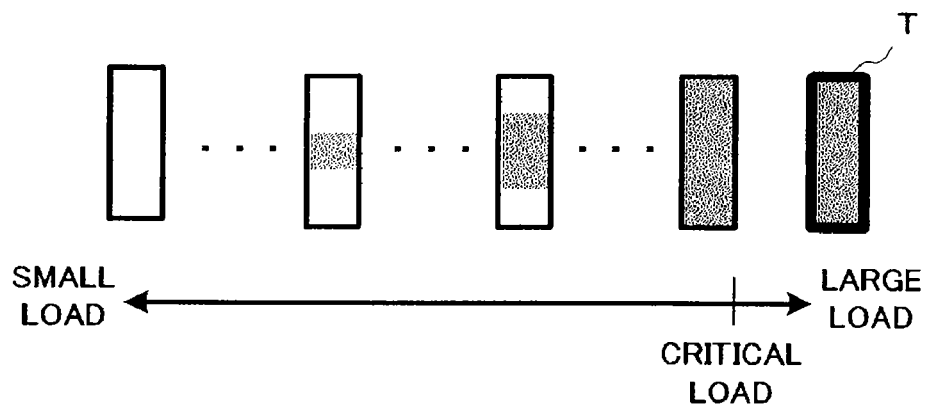
SMALL LOAD ← → LARGE LOAD
CRITICAL LOAD
F I G. 12A
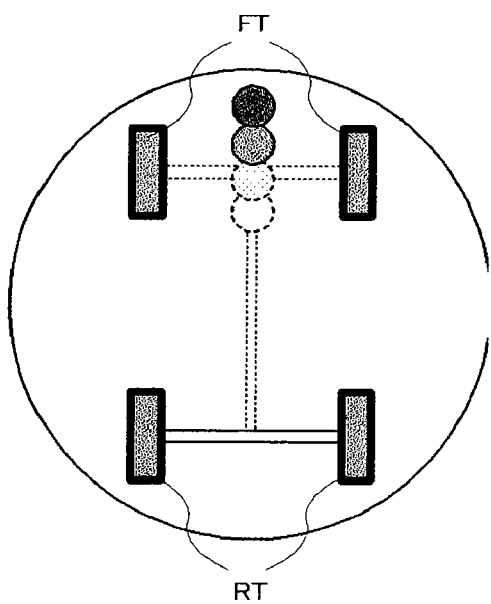
F I G. 12B
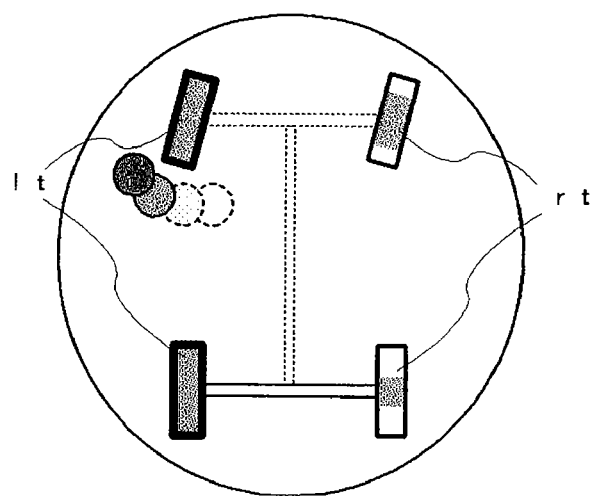
F I G. 12C

US 7,602,397 B2

IMAGE CREATING DEVICE, LOAD DISPLAY METHOD, RECORDING MEDIUM, AND PROGRAM

TECHNICAL FIELD

The present invention relates to an image creating device, a load display method, a recording medium, and a program suitable for appropriately visualizing a load, etc. that occurs along with a running condition of a virtual vehicle in a virtual space.

BACKGROUND ART

Conventionally, game devices for business use and home use have been widely spread. With such a game device, for example, one can enjoy a race game by a vehicle such as a car, etc.

In such a race game, for example, the user (player) typically operates a controller or the like, and drives a virtual vehicle (an F1 machine, a stock car, or the like), which runs in a virtual space, to a predetermined goal point, vying for the time taken or vying with other vehicles for earlier arrival.

Further, a technique for a race game device which enables even a user not experienced in game operations to enjoy a race game with relatively simple operations, has also been disclosed (for example, see Patent Literature 1).

Patent Literature 1: Unexamined Japanese Patent Application KOKAI Publication No. H11-114222 (pp. 2-3, FIG. 1)

DISCLOSURE OF INVENTION

Problem to be Solved by the Invention

However, in most cases, conventional game devices, which have provided joyful race game experiences, have not been able to make the behaviors of the virtual vehicle sufficiently graspable during the play.

Specifically, if in a real vehicle, the driver, etc. feel a backward load or a forward load because an inertia force acts in acceleration or deceleration, etc. Further, when turning at a corner, etc., the driver, etc. feel a load that is reverse to the turning direction because a centrifugal force acts. By feeling such loads, the driver, etc. can easily grasp the behavior of the vehicle and running conditions.

In contrast, in playing a race game, there is a problem that the user cannot feel any kind of load from the displayed image, and cannot therefore sufficiently grasp the behavior of the virtual vehicle.

The present invention was made to solve such a problem, and an object of the present invention is to provide an image creating device, a load display method, a recording medium, and a program capable of appropriately visualizing a load, etc. that occurs along with a running condition of a virtual vehicle in a virtual space.

Means for Solving the Problem

An image creating device according to a first aspect of the present invention comprises an operation input reception unit, a running condition managing unit, a symbol drawing unit, a tire image drawing unit, a meter image creating unit, and a display unit, which are configured as follows.

First, the operation input reception unit receives an operation input for a virtual vehicle to be moved in a virtual space. Further, the running condition managing unit manages a running condition of the virtual vehicle based on the received operation input. Then, the symbol drawing unit draws a load symbol, whose display position changes according to a load based on the managed running condition.

Meanwhile, the tire image drawing unit draws an image of a tire whose display manner changes according to the load based on the managed running condition. Further, the meter image creating unit creates a meter image including the drawn load symbol and image of the tire, based on the load calculated. Then, the display unit displays the created meter image.

That is, since the meter image, which includes the load symbol indicating the direction and level of a load and the image of the tire whose display manner changes according to the load, is displayed, the user can recognize the load that occurs due to his/her own operation.

As a result, it is possible to appropriately visualize the load, etc. which occur along with a running condition of the virtual vehicle.

An image creating device according to a second aspect of the present invention comprises an image information storage unit, an operation input reception unit, a running condition managing unit, a load calculation unit, a symbol drawing unit, a tire image drawing unit, a meter image creating unit, and a display unit, which are configured as follows.

First, the image information storage unit stores image information including a scenery image to be allocated in a virtual space. Further, the operation input reception unit receives an operation input for a virtual vehicle to be moved in the virtual space. Further, the running condition managing unit manages a running condition of the virtual vehicle based on the received operation input. Then, the load calculation unit calculates a load imposed on the virtual vehicle, based on the managed running condition.

Meanwhile, the symbol drawing unit draws a load symbol, whose display position changes based on the calculated load. Further, the tire image drawing unit draws an image of a tire, whose display manner changes based on the calculated load. Further, the meter image creating unit creates a meter image including the drawn load symbol and image of the tire. Then, the display unit displays the created meter image.

That is, since the meter image, which includes the load symbol indicating the direction and level of a load and the image of the tire whose display manner changes according to the load, is displayed, the user can recognize the load that occurs due to his/her own operation.

As a result, it is possible to appropriately visualize the load, etc., which occur along with a running condition of a virtual vehicle.

Further, the tire image drawing unit may draw an image of a tire, in which a coloring area of a predetermined color changes according to the calculated load.

Further, the tire image drawing unit may draw an image of a tire, whose shape changes according to the calculated load.

Further, the tire image drawing unit may change a color of an external frame of the image of the tire, in a case where the calculated load exceeds a predetermined critical load.

A load display method according to a third aspect of the present invention comprises an operation input receiving step, a running condition managing step, a symbol drawing step, a tire image drawing step, a meter image creating step, and a display controlling step, which are configured as follows.

First, at the operation input receiving step, an operation input for a virtual vehicle to be moved in a virtual space is received. Further, at the running condition managing step, a running condition of the virtual vehicle is managed based on the received operation input. Then, at the symbol drawing step, a load symbol, whose display position changes according to a load based on the managed running condition, is drawn.

Meanwhile, at the tire image drawing step, an image of a tire, whose display manner changes according to the load based on the managed running condition, is drawn. Further, at the meter image creating step, a meter image including the drawn load symbol and image of the tire is created. Then, at the display controlling step, the created meter image is displayed on a predetermined display unit.

That is, since the meter image, which includes the load symbol indicating the direction and level of a load and the image of the tire whose display manner changes according to the load, is displayed, the user can recognize the load that occurs due to his/her own operation.

As a result, it is possible to appropriately visualize the load, etc., which occur along with a running condition of a virtual vehicle.

A program according to a fourth aspect of the present invention controls a computer (including a game device) to function as the above-described image creating device.

This program can be stored on a computer-readable information recording medium (recording medium) such as a compact disk, a flexible disk, a hard disk, a magneto optical disk, a digital video disk, a magnetic tape, a semiconductor memory, etc.

The above-described program can be distributed and sold via a computer communication network, independently from a computer on which the program is executed. Further, the above-described information recording medium can be distributed and sold independently from the computer.

EFFECT OF THE INVENTION

According to the present invention, it is possible to appropriately visualize the load, etc. which occur according to a running condition of a virtual vehicle in a virtual space.

[FIG. 1] It is an exemplary diagram showing a schematic structure of a typical game device on which an image creating device according to an embodiment of the present invention is realized.

Figure 2:
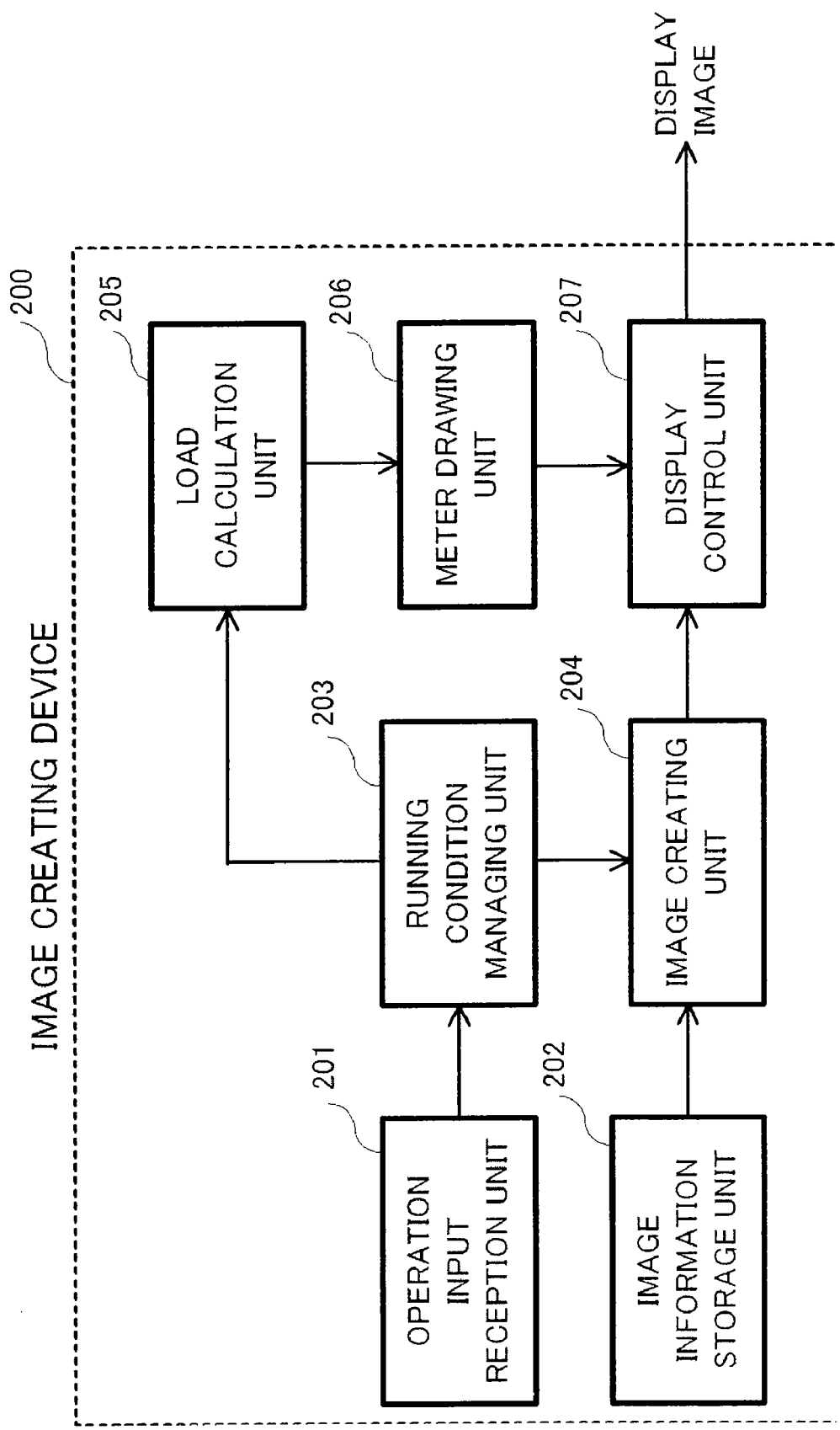

[FIG. 2] It is an exemplary diagram showing a schematic structure of an image creating device according to an embodiment of the present invention.

[FIG. 3A] It is an exemplary diagram showing an example of information managed by a running condition managing unit of the image creating device.

[FIG. 3B] It is an exemplary diagram showing an example of information managed by the running condition managing unit of the image creating device.

Figure 4:
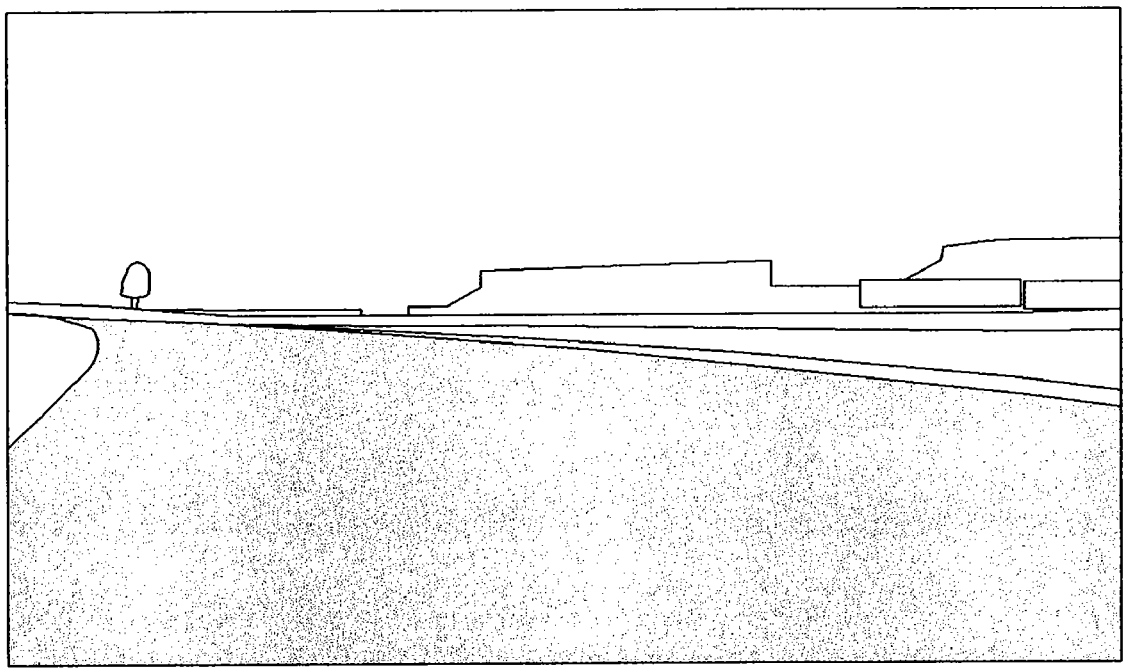

[FIG. 4] It is an exemplary diagram showing an example of a view field image drawn by an image creating unit of the image creating device.

Figure 5A:
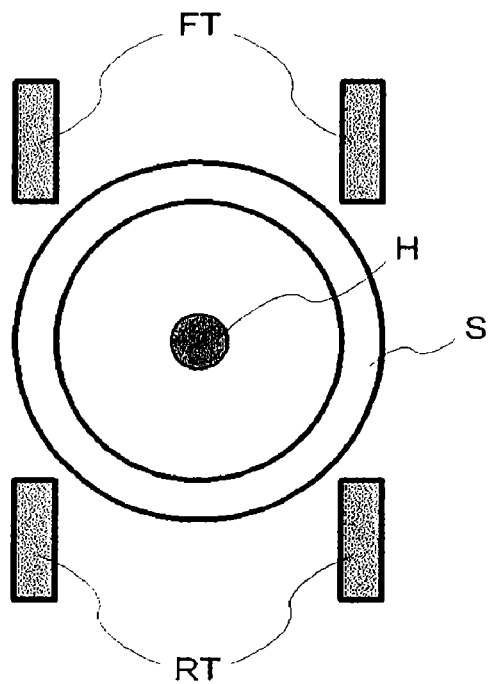

[FIG. 5A] It is an exemplary diagram showing an example of a meter image drawn by a meter drawing unit of the image creating device.

Figure 5B:
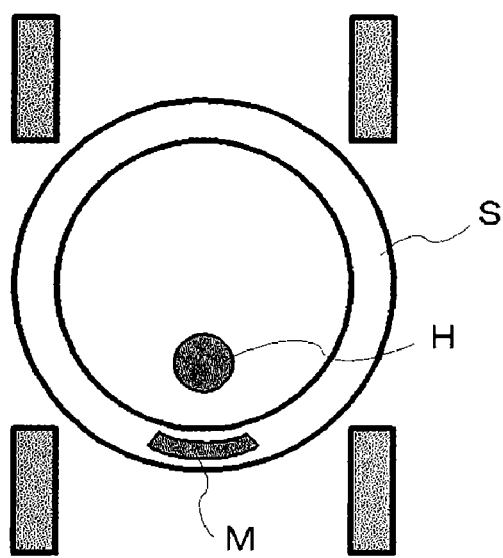

[FIG. 5B] It is an exemplary diagram showing an example of a meter image drawn by the meter drawing unit of the image creating device.

Figure 5C:
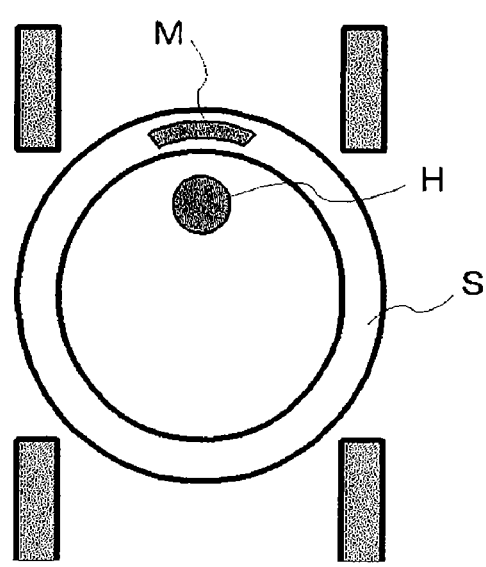

[FIG. 5C] It is an exemplary diagram showing an example of a meter image drawn by the meter drawing unit of the image creating device.

[FIG. 5D] It is an exemplary diagram showing an example of a meter image drawn by the meter drawing unit of the image creating device.

[FIG. 5E] It is an exemplary diagram showing an example of a meter image drawn by the meter drawing unit of the image creating device.

Figure 6:
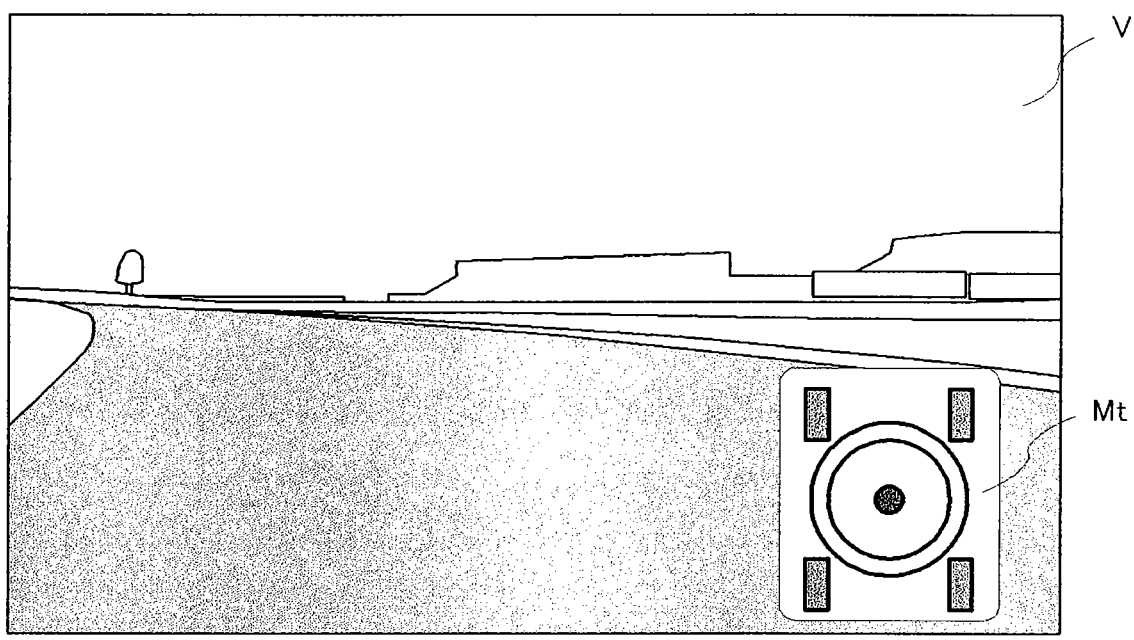

[FIG. 6] It is an exemplary diagram showing an example of a display image in which a view field image and a meter image are synthesized.

Figure 7:
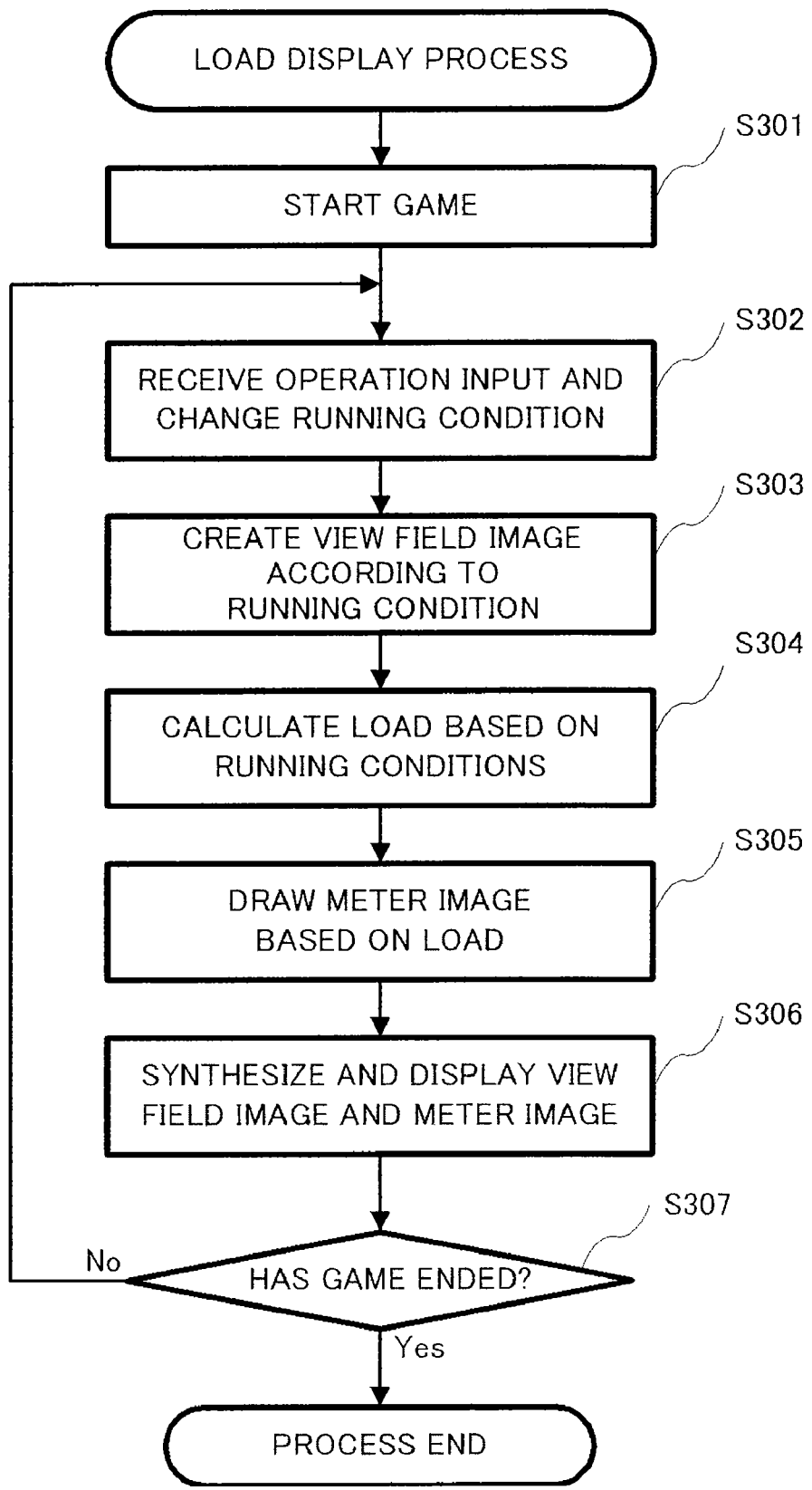

[FIG. 7] It is a flowchart showing the flow of a load display process performed by the image creating device.

Figure 8A:
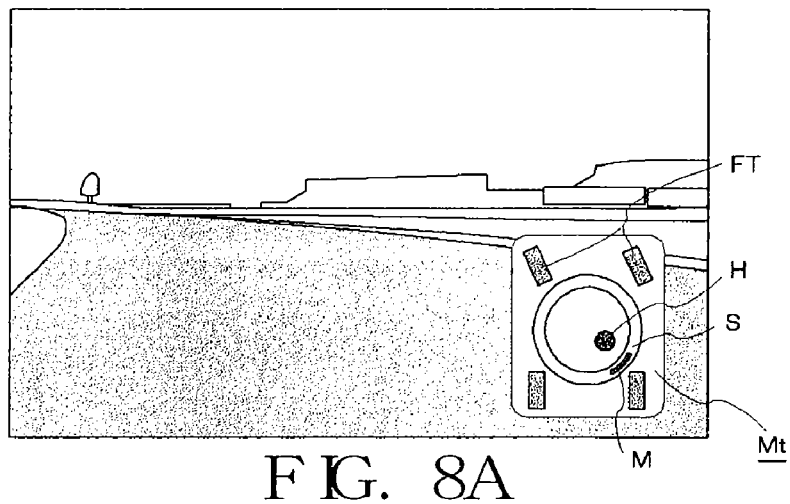

[FIG. 8A] It is an exemplary diagram showing an example of a display image.

Figure 8B:
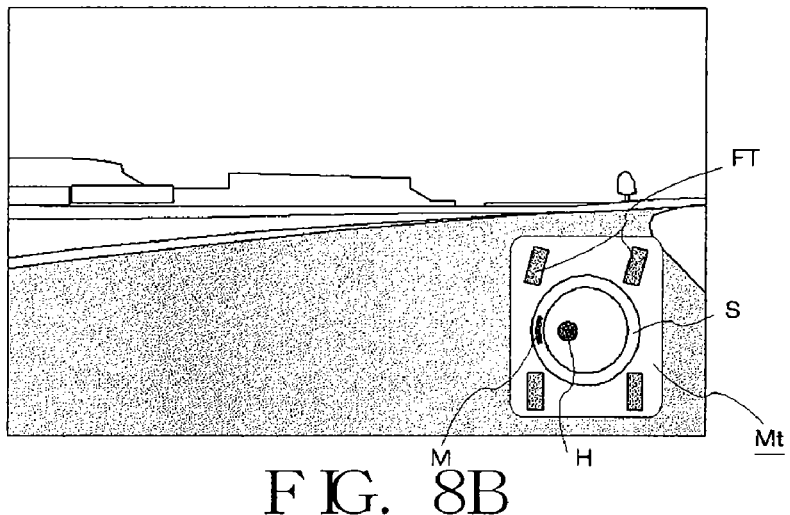

[FIG. 8B] It is an exemplary diagram showing an example of a display image.

Figure 8C:
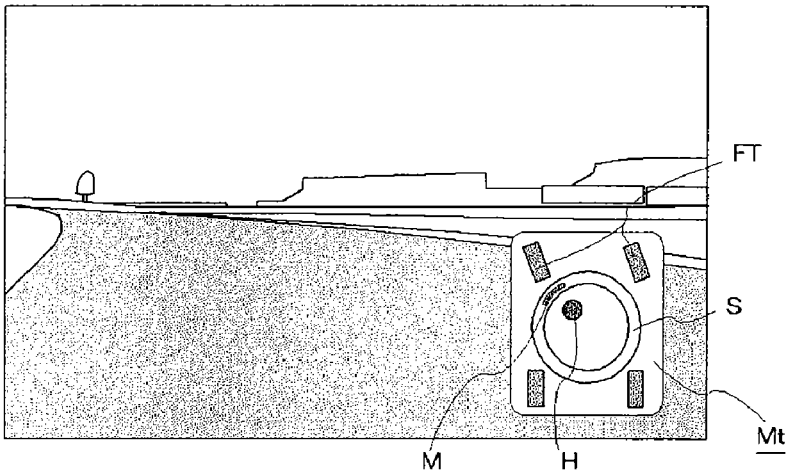

[FIG. 8C] It is an exemplary diagram showing an example of a display image.

[FIG. 9A] It is an exemplary diagram showing an example of another meter image.

[FIG. 9B] It is an exemplary diagram for explaining the locus (afterimage) of a head symbol.

[FIG. 9C] It is an exemplary diagram for explaining the locus (afterimage) of the head symbol.

Figure 10:
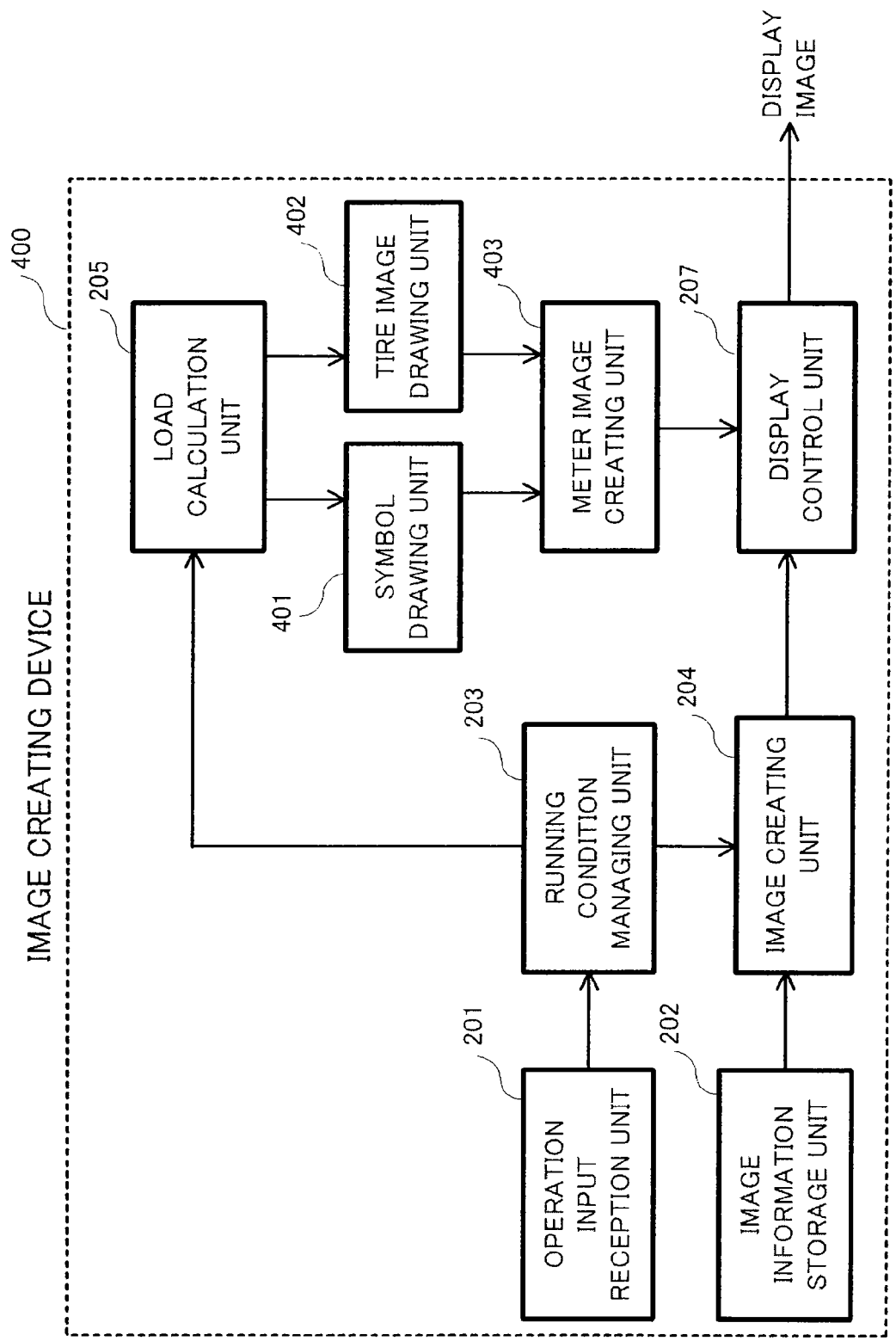

[FIG. 10] It is an exemplary diagram showing a schematic structure of an image creating device according to another embodiment of the present invention.

[FIG. 11A] It is an exemplary diagram for explaining the state of the changes of the display of the load on tires.

[FIG. 11B] It is an exemplary diagram showing an example of the display of the load on the tires.

[FIG. 11C] It is an exemplary diagram showing an example of the display of the load on the tires.

[FIG. 12A] It is an exemplary diagram for explaining the display of the tires which exceeds a critical load.

[FIG. 12B] It is an exemplary diagram showing an example of the display of a load which exceeds a critical load.

[FIG. 12C] It is an exemplary diagram showing an example of the display of a load which exceeds a critical load.

Figure 13A:
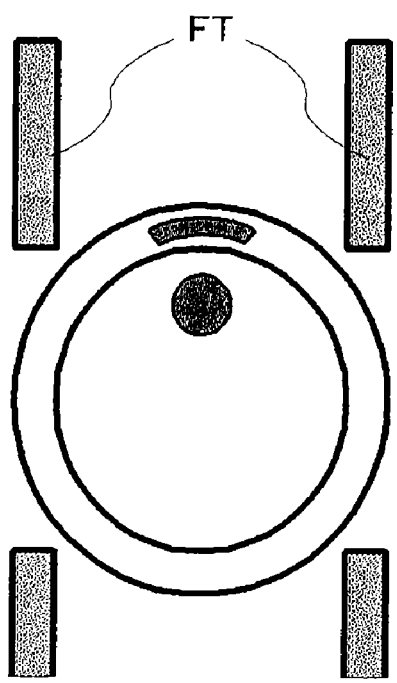

[FIG. 13A] It is an exemplary diagram showing an example of another meter image in which the display of the shape of the tires is different.

Figure 13B:
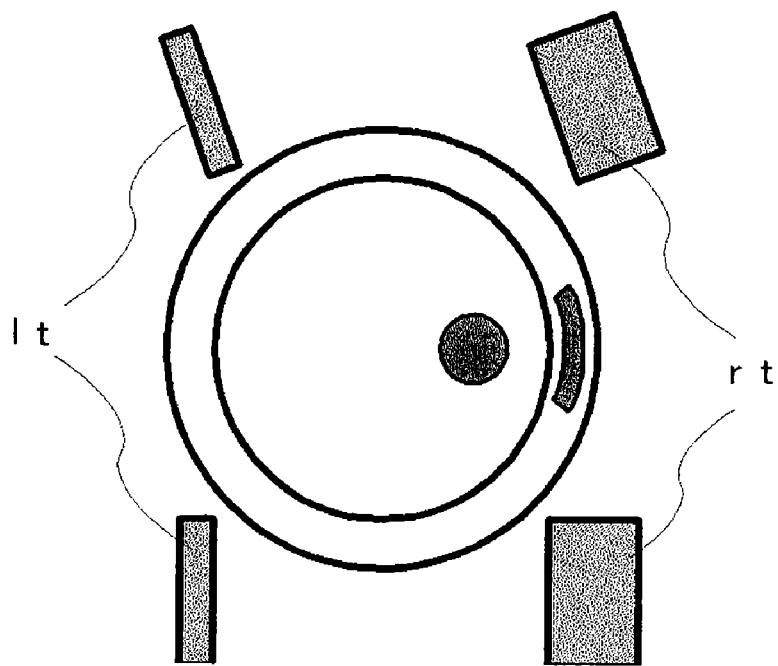

[FIG. 13B] It is an exemplary diagram showing an example of another meter image in which the display of the shape of the tires is different.

Figure 14A:
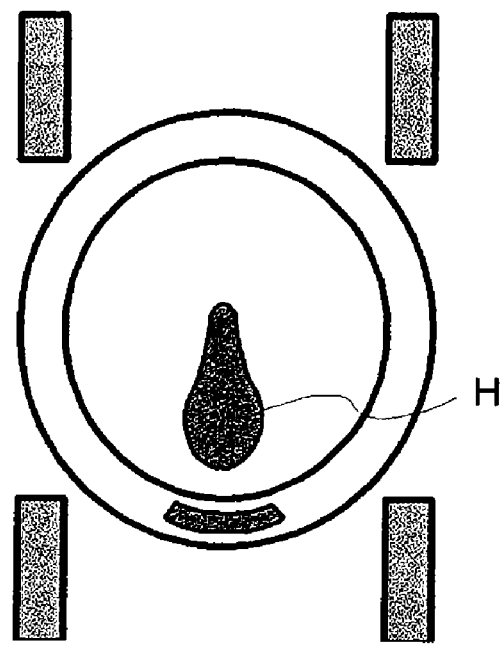

[FIG. 14A] It is an exemplary diagram showing an example of another meter image in which the shape of the head symbol is different.

Figure 14B:
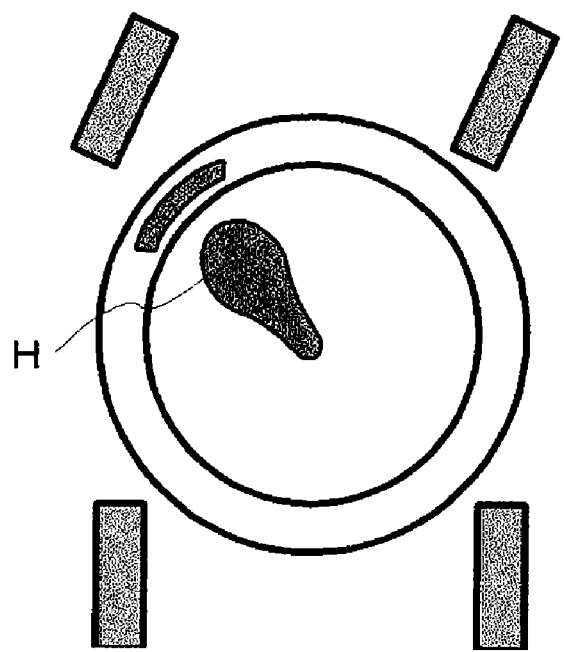

[FIG. 14B] It is an exemplary diagram showing an example of another meter image in which the shape of the head symbol is different.

EXPLANATION OF REFERENCE NUMERALS 100 game device
101 CPU
102 ROM
103 RAM
104 interface
105 controller
106 external memory
107 DVD-ROM drive
108 image processing unit
109 audio processing unit
110 NIC
200 image creating device
201 operation input reception unit
202 image information storage unit
203 running condition managing unit
204 image creating unit
205 load calculation unit 206 meter drawing unit
207 display control unit

BEST MODE FOR CARRYING OUT THE INVENTION

Embodiment 1

FIG. 1 is an exemplary diagram showing a schematic structure of a typical game device on which an image creating device according to an embodiment of the present invention will be realized. The following explanation will be given with reference to this diagram.

A game device 100 comprises a CPU (Central Processing Unit) 101, a ROM (Read Only Memory) 102, a RAM (Random Access Memory) 103, an interface 104, a controller 105, an external memory 106, a DVD (Digital Versatile Disk)-ROM drive 107, an image processing unit 108, an audio processing unit 109, and an NIC (Network Interface Card) 110.

By loading a DVD-ROM storing a game program and data onto the DVD-ROM drive 107 and turning on the power of the game device 100, the program will be executed and the image creating device according to the present embodiment will be realized.

The CPU 101 controls the operation of the entire game device 100, and is connected to each element to exchange control signals and data.

The ROM 102 stores an IPL (Initial Program Loader) to be executed immediately after the power is turned on, execution of which triggers the program stored on the DVD-ROM to be read into the RAM 103 and executed by the CPU 101. Further, the ROM 102 stores a program and various data for an operating system necessary for controlling the operation of the entire game device 100.

The RAM 103 is for temporarily storing data and programs, and retains the program and data read out from the DVD-ROM, and other data necessary for game proceedings and chat communications.

The controller 105 connected through the interface 104 receives an operation input given by the user when playing the game.

The external memory 106 detachably connected through the interface 104 rewritably stores data indicating the progress status of the game, data of chat communication logs (records), etc. The user can store these data on the external memory 106 where needed, by inputting instructions through the controller 105.

The DVD-ROM to be loaded on the DVD-ROM drive 107 stores a program for realizing the game and image data and audio data accompanying the game. Under the control of the CPU 101, the DVD-ROM drive 107 performs a reading process on the DVD-ROM loaded thereon to read out a necessary program and data, which are to be temporarily stored on the RAM 103, etc.

The image processing unit 108 processes the data read out from the DVD-ROM by means of the CPU 101 and an image calculation processor (unillustrated) provided in the image processing unit 108, and thereafter stores the data in a frame memory (unillustrated) provided in the image processing unit 108. The image information stored in the frame memory is converted into a video signal at a predetermined synchronization timing and output to a monitor (unillustrated) connected to the image processing unit 108. Thereby, image displays of various types are available.

Note that the image calculation processor can rapidly perform transparent operations such as overlay operation or ax blending of two-dimensional images, and saturate operations of various types.

Further, the image calculation processor can also rapidly perform an operation for rendering, by a Z buffer method, polygon information placed in a virtual three-dimensional space and having various texture information added, to obtain a rendered image of the polygon placed in the virtual three-dimensional space as seen from a predetermined view position.

Further, by the CPU 101 and the image calculation processor working in cooperation, a character string as a two-dimensional image can be depicted on the frame memory, or depicted on the surface of each polygon, according to font information defining the shape of the characters. The font information is stored in the ROM 102, but specially-prepared font information stored on the DVD-ROM may be used.

The audio processing unit 109 converts audio data read out from the DVD-ROM into an analog audio signal, and outputs the signal from a speaker (unillustrated) connected thereto. Further, under the control of the CPU 101, the audio processing unit 109 generates sound effects and music data to be sounded in the course of the game, and outputs the sounds corresponding to the data from the speaker.

The NIC 110 is for connecting the game device 100 to a computer communication network (unillustrated) such as the Internet, etc., and comprises a 10BASE-T/100BASE-T product used for building a LAN (Local Area Network), an analog modem, an ISDN (Integrated Services Digital Network) modem, or an ADSL (Asymmetric Digital Subscriber Line) modem for connecting to the Internet by using a telephone line, a cable modem for connecting to the Internet by using a cable television line, or the like, and an interface (unillustrated) for intermediating between these and the CPU 101.

Aside from the above, the game device 100 may be configured to perform the same functions as the ROM 102, the RAM 103, the external memory 106, the DVD-ROM to be loaded on the DVD-ROM drive 107, etc. by using a large-capacity external storage device such as a hard disk, etc.

Further, it is also possible to employ an embodiment where a keyboard for accepting a character string editing input from the user, and a mouse for accepting various position designations and selection inputs from the user are connected.

Furthermore, a general computer (a general-purpose personal computer, etc.) may be used instead of the game device 100 of the present embodiment. For example, a general computer comprises a CPU, a RAM, a ROM, a DVD-ROM drive, and an NIC likewise the above-described game device 100, comprises an image processing unit having simpler functions than those of the game device 100, comprises a hard disk as an external storage device, and can also use a flexible disk, a magneto optical disk, a magnetic tape, etc. Further, such a general computer uses not a controller but a keyboard and a mouse as the input device.

(Schematic Structure of Image Creating Device)

FIG. 2 is an exemplary diagram showing a schematic structure of the image creating device according to the present embodiment. The following explanation will be given with reference to this diagram.

The image creating device 200 comprises an operation input reception unit 201, an image information storage unit 202, a running condition managing unit 203, an image creating unit 204, a load calculation unit 205, a meter drawing unit 206, and a display control unit 207.

The explanation will be given to a case that the image creating device 200 is applied to a racing game where a racing car or the like, which runs on a circuit within a virtual space, is operated.

First, the operation input reception unit 201 receives an operation input for a racing car (virtual vehicle) which is to be run on a circuit within a virtual space.

For example, the operation input reception unit 201 receives an operation input for a brake operation, an accelerator operation, a steering wheel operation, and a shifter operation, etc. necessary for running the racing car.

The controller 105 can function as the operation input reception unit 201.

The image information storage unit 202 stores image information which defines scenery images, etc. which include the running path on the circuit within the virtual space. Other than this, the image information storage unit 202 stores image information which defines a plurality of racing cars including the racing car to be operated by the user, and etc.

The DVD-ROM loaded on the DVD-ROM drive 107, the external memory 106, etc. can function as such an image information storage unit 202.

The running condition managing unit 203 manages the running conditions of the racing car operated by the user, and the running conditions of the other racing cars.

For example, the running condition managing unit 203 manages information which defines the running conditions as shown in FIGS. 3A and 3B.

The information shown in FIG. 3A is information to be updated where necessary, according to operation information of various types sent from the operation input reception unit 201. That is, the running conditions of the racing car operated by the user are managed by the information of FIG. 3A.

The information shown in FIG. 3B is information to be updated automatically based on predetermined logics and parameters. That is, the running conditions of the other racing cars which are run automatically are managed by the information of FIG. 3B.

Further, the running condition managing unit 203 manages contacts and collisions between racing cars, based on the information of FIGS. 3A and 3B.

The CPU 101 can function as such a running condition managing unit 203.

The image creating unit 204 creates an image (image in the proceeding direction) ahead of the racing car operated by the user, based on the image information stored in the image information storage unit 202 and the running conditions managed by the running condition managing unit 203.

Specifically, the image creating unit 204 depicts a view field image (driver's view) as shown in FIG. 4, which is observed when the view outside the car is seen from the driver's seat of the racing car.

The image processing unit 108 can function as such an image creating unit 204.

The load calculation unit 205 calculates the load (direction and level) added on the racing car (more specifically, on the virtual operator) operated by the user, based on the running conditions managed by the running condition managing unit 203.

For example, in a case where the running condition managed is acceleration or deceleration, the load calculation unit 205 calculates the load in the forward or backward direction imposed on the virtual operator, produced due to an inertia force, etc., and the level thereof. Specifically, the load calculation unit 205 calculates, from the direction of the acceleration, the direction of the load which is in a reverse direction to that direction, and calculates the level of the load by multiplying the acceleration and the weight of the operator (see Equation 1, as an example). There may be prepared plural virtual operators, and the user may arbitrarily select from them. And the weights of the respective operators may be different from each other.

$f = m\alpha$ f: load m: weight (mass) of the operator $\alpha$: acceleration  (Equation 1)

Further, in a case where the running condition managed is turning, the load calculation unit 205 calculates the load in the leftward or rightward direction imposed on the virtual operator, produced due to a centrifugal force, etc., and the level thereof. Specifically, the load calculation unit 205 obtains the turning radius from the steering angle, etc., to calculate the direction toward the center of the circular arc and the direction of the load, and obtains the angular velocity from the velocity and the turning radius to calculate the level of the load by multiplying the second power of the angular velocity by the turning radius and the weight of the operator (see Equation 2, as an example)

$f = m\alpha = mr\omega^2$ f: load m: weight (mass) of the operator $\alpha$: acceleration r: turning radius $\omega$: angular velocity  (Equation 2)

The CPU 101 can function as such a load calculation unit 205.

The meter drawing unit 206 creates a meter image (indicator), which represents the load imposed on the virtual operator in an easy-to-understand manner, based on the load (direction and level) calculated by the load calculation unit 205. As an example, the meter drawing unit 206 creates a meter image which represents, in a simplified manner, the state of the operator's head moving (being swung) by the load when the virtual operator is observed from above.

Specifically, the meter drawing unit 206 creates meter images as shown in FIGS. 5A to 5E.

First, the meter image of FIG. 5A is an example to be created in a case where no load is imposed on the virtual operator (in case of stop, constant velocity running, etc.). Specifically, a head symbol H representing the head of the operator is positioned at the center (origin) of a circle S representing a cockpit (control compartment), which indicates that the head of the operator is not swung by any load. Further, the meter image includes front tires FT and rear tires RT representing the tires of the virtual vehicle.

The meter image of FIG. 5B is an example to be created in a case where the load works in the backward direction (in case of accelerated running, being rear-ended by another vehicle, etc.). Specifically, the head symbol H is positioned at the back (behind the origin) within the circle S, indicating that the head of the operator is swung in the backward direction by the load. Note that the position of the head symbol H changes appropriately according to the level of the load. Further, on the circle S, a marker M is indicated at the back of the ring, to emphasize the direction in which the load works. Note that this marker M may also be changed in color, etc. according to the level of the load, so that the level of the load may be emphasized.

Meanwhile, the meter image of FIG. 5C is an example to be created in a case where the load works in the forward direction (in case of decelerated running by braking, rear-ending another vehicle, etc.). Specifically, the head symbol H is positioned at the front (ahead of the origin) within the circle S, indicating that the head of the operator is swung in the forward direction by the load. The marker M is indicated at the front of the ring of the circle S.

The meter image of FIG. 5D is an example to be created in a case where the load works in the rightward direction (in case of constant velocity running while turning to the left, etc.). Specifically, the head symbol H is positioned at the right (rightward from the origin) within the circle S, indicating that the head of the operator is swung in the rightward direction by the load. The marker M is indicated at the right of the ring of the circle S. Further, the front tires FT indicate the turning angle of the tires according to the steering wheel operation (left turn).

Meanwhile, the meter image of FIG. 5E is an example to be created in a case where the load works in the left-forward direction (in case of decelerated running while turning to the right, etc.). Specifically, the head symbol H is positioned at the left front (left-forward from the origin) within the circle S, indicating that the head of the operator is swung to the left-forward direction by the load. The marker M is indicated at the left front of the ring of the circle S. Further, the front tires FT indicate the turning angle of the tires according to the steering wheel operation (right turn).

In sum, the meter drawing unit 206 creates a meter image in which the head symbol H is moved to a corresponding position (a position shifted from the origin in a corresponding direction by an opposite distance) within the circle S according to the direction in which the load works and the level of the load. By this, the meter drawing unit 206 indicates in which direction and how much the head of the operator is swung by the load.

Further, the meter drawing unit 206 displays the marker M on the circle S where appropriate, in order to emphasize the direction in which the load works, etc. Furthermore, the meter drawing unit 206 displays the front tires FT at a tilt in order to indicate the turning angle of the tires according to the steering wheel operation.

The image processing unit 108 can function as such a meter drawing unit 206.

The display control unit 207 appropriately synthesizes the view field image created by the image creating unit 204 and with the meter image created by the meter drawing unit 206, and thereafter converts the synthesized image into a predetermined image signal to display the image on an external monitor or the like.

For example, the display control unit 207 creates a display image obtained by synthesizing the view field image V and the meter image Mt, as shown in FIG. 6. Then, the display control unit 207 converts the display image created in this manner into a video signal at a predetermined synchronization timing, and supplies it to the external monitor or the like.

The image processing unit 108 can function as such a display control unit 207.

FIG. 7 is a flowchart showing the flow of a load display process performed by the image creating device 200. The following explanation will be given with reference to this diagram. Note that this load display process is started, for example, synchronously with the game proceeding when a car race game is played.

First, when the car race game is started (step S301), the image creating device 200 receives an operation input, and updates the running condition of the racing car (step S302).

Specifically, when the operation input reception unit 201 receives an accelerator operation, a brake operation, a steering wheel operation, a shifter operation, etc. from the user, the running condition managing unit 203 updates the running condition (current position, running direction, velocity, etc.) according to the operations.

The image creating device 200 creates a view field image according to the running condition (step S303).

Specifically, the image creating unit 204 creates a view field image (driver's view) based on the image information stored in the image information storage unit 202 and the running condition managed by the running condition managing unit 203.

The image creating device 200 calculates the load based on the running condition (step S304).

Specifically, the load calculation unit 205 calculates the load (direction and level) to be imposed on the racing car (operator) operated by the user, based on the running condition managed by the running condition managing unit 203.

For example, in a case where the running condition managed is acceleration or deceleration, the load calculation unit 205 calculates the load in the forward or backward direction imposed on the virtual operator, produced due to an inertia force, and the level thereof. Further, in a case where the running condition managed is turning, the load calculation unit 205 calculates the load in the leftward or rightward direction imposed on the virtual operator, produced due to a centrifugal force, and the level thereof. Further, in a case where an inertia force and a centrifugal force are produced simultaneously (in case of accelerated/decelerated running during making a turn, etc.), the load calculation unit 205 calculates the load (direction and level) in which these are combined.

The image creating device 200 draws a meter image based on the calculated load (step S305).

Specifically, the meter drawing unit 206 creates a meter image as shown in FIGS. 5A to 5E described above, based on the load (direction and level) calculated by the load calculation unit 205. Specifically, the meter drawing unit 206 creates a meter image, etc. in which the head symbol H is moved from the center of the circle S in a corresponding direction by a corresponding distance, according to the direction in which the load works and the level of the load.

The image creating device 200 displays a display image in which the view field image and the meter image are synthesized (step S306).

Specifically, the display control unit 207 appropriately synthesizes the view field image created by the image creating unit 204 and the meter image created by the meter drawing unit 206, and after this, converts the synthesized image into a predetermined image signal, and displays it on the external monitor or the like.

For example, in a case where the racing car operated by the user is accelerating while turning to the left at a gentle left corner, a meter image Mt as shown in FIG. 8A, in which the head symbol H is positioned at the right back (right-backward from the origin) within the circle S and the marker M is lit at the right back portion of the circle S, is displayed. This indicates a state that a centrifugal force occurs along with the left turn while an inertia force occurs along with the acceleration, and a load in which these are combined swings the head of the operator in the right-backward direction. Further, the turning angle of the tires while the left turn is being made is also indicated by the tilt of the front tires FT.

That is, the user can feel the load in the right-backward direction, by the move of the head symbol H in the right-backward direction, etc.

Further, in a case where the racing car is turning to the right at a right corner at a constant velocity, a meter image Mt as shown in FIG. 8B, in which the head symbol H is positioned at the left (leftward from the origin) within the circle S and the marker M is lit at the left portion of the circle S, is displayed. This indicates a state that the head of the operator is swung in the leftward direction by a centrifugal force which occurs along with the right turn. Further, the turning angle of the tires while the right turn is being made is indicated by the tilt of the front tires FT.

That is, the user can feel the load in the leftward direction, by the move of the head symbol H in the leftward direction, etc.

Furthermore, in a case where the racing car is making a drift running at a left corner (making a decelerated running while sliding the tires in the left-forward direction, with the vehicle kept facing diagonally rightward), a meter image Mt as shown in FIG. 8C, in which the head symbol H is positioned at the left front (left-forward from the origin) within the circle S and the marker M is lit at the left front portion of the circle S, is displayed. This indicates a state that the head of the operator is swung in the left-forward direction by an inertia force, which occurs along with the deceleration in the diagonal rightward direction. Further, the turning angle of the tires during drifting is indicated by the tilt of the front tires FT.

That is, the user can feel the load in the left-forward direction, by the move of the head symbol H in the left-forward direction, etc.

Then, the image creating device 200 determines whether or not the game has ended (step S307).

In a case where it is determined that the game has not ended, the image creating device 200 returns the process to step S302, and repeatedly performs the processes at steps S302 to S307 described above.

On the other hand, in a case where it is determined that the game has ended, the image creating device 200 terminates the load display process.

As described above, according to the present embodiment, a meter image in which the head symbol H is moved from the origin (moved in a corresponding direction by a corresponding distance) according to the load based on the running condition is displayed, and the user feels the load imposed on the virtual operator, from this meter image. As a result, it is possible to appropriately visualize the load, etc., which occur along with the moving condition of a moving object.

Another Embodiment

In the above-described embodiment, the explanation has been given by using a meter image as shown in FIG. 5A as an example. However, other than this, the drive system, etc. of the virtual vehicle may be displayed. Further, the locus (after-image) of the head symbol H may be displayed in order to make the movement of the head symbol H more understandable.

For example, a meter image as shown in FIG. 9A may be drawn. This meter image includes an axle J, which indicates the drive system. Since the case of this example indicates rear wheel drive, the axle J is displayed between the rear tires RT. Note that the axle J is displayed between the front tires FT in case of front wheel drive, and axles J are displayed between the front tires FT and the rear tires F in case of 4-wheel drive.

Then, the head symbol H in this meter image is displayed with its locus (afterimage).

For example, the meter drawing unit 206 draws a head symbol H accompanied by its locus as shown in FIG. 9B. In case of this example, the meter drawing unit 206 records a predetermined number of past positions of the head symbol H (or past positions of the head symbol H for a predetermined period), and draws the predetermined number of past head symbols H by gradually varying the color, the transparency degree, etc. when drawing a new head symbol H. That is, the meter drawing unit 206 draws the image in a manner to make it clear that the past head symbols H are the locus.

Further, the meter drawing unit 206 may draw a head symbol H, which is accompanied by a locus as shown in FIG. 9C. In case of this example, the meter drawing unit 206 draws a head symbol H, which is moved to its new position in a manner to trace (to be slid over) the predetermined number of its past positions (or its past positions for the predetermined period).

With the head symbol H with a locus as shown in FIGS. 9B and 9C displayed, the user can grasp the track of the movement of the head symbol H, and feels the load imposed on the virtual operator more dynamically. As a result, it is possible to appropriately visualize the load, etc., which occur along with the moving condition of a moving object.

In the above-described embodiment, a case that the load imposed on the virtual operator is visualized by the position (including the locus, etc.) of the head symbol H in the meter image, has been explained. The load that is imposed on the virtual vehicle (to be more specific, on the front and rear four tires) may further be visualized.

Another embodiment of the present invention, which is for appropriately visualizing the load imposed on the virtual vehicle, will be explained below with reference to the drawings.

FIG. 10 is an exemplary diagram showing a schematic structure of an image creating device according to another embodiment.

The image creating device 400 comprises an operation input reception unit 201, an image information storage unit 202, a running condition managing unit 203, an image creating unit 204, a load calculation unit 205, a symbol drawing unit 401, a tire image drawing unit 402, a meter image creating unit 403, and a display control unit 207.

That is, the symbol drawing unit 401, the tire image drawing unit 402, and the meter image creating unit 403 are added instead of the meter drawing unit 206 of the image creating device 200 shown in FIG. 2.

The symbol drawing unit 401 draws a load symbol, whose display position changes according to the load calculated by the load calculation unit 205. That is, the symbol drawing unit 401 draws the above-described head symbol H, whose display position changes, according to the load based on the running condition.

The tire image drawing unit 402 draws a tire image, whose display manner changes according to the load calculated by the load calculation unit 205.

For example, in creating the front tires FT and the rear tires RT, the tire image drawing unit 402 draws an image of tires which are different in the display manner as shown in FIG. 11A, based on the level of the load calculated. That is, the tire image drawing unit 402 displays the image by varying the area over which the tire is painted (black, etc.) in the lengthwise direction extending back and forth from the axle setting the center, according to the level of the load.

Specifically, in a case where the load works in the forward direction (in case of decelerated running by braking, etc.), the tire image drawing unit 402 draws a tire image in which the painting area of the front tires FT is larger than the painting area of the rear tires RT, in the meter image, as shown in FIG. 11B.

Further, in a case where the load works in the left-forward direction (in case of decelerated running while turning to the right, etc.), the tire image drawing unit 402 draws a tire image in which the painting area of a front tire FT is larger than the painting area of the rear tires RT and the front and rear tires lt on the left are larger in the painting area than the front and rear tires rt on the right, in the meter image, as shown in FIG. 11C.

That is, the tire image drawing unit 402 draws a tire image in which the display manner of each tire is changed according to the load (direction and level) calculated by the load calculation unit 205.

Returning to FIG. 10, the meter image creating unit 403 creates a meter image, which includes the load symbol drawn by the above-described symbol drawing unit 401, and the tire image drawn by the above-described tire image drawing unit 402.

Like this, with the image creating device shown in FIG. 10, it is possible to appropriately visualize the load, etc., that occur along with the moving condition of a moving object, also by the tire image included in the meter image.

Further, the situation of the critical load of the tires being surpassed may be displayed. For example, as shown in FIG. 12A, the critical load (may be varied according to the load direction, or may change according to the number of laps, etc.) of the tires is defined, and the color of the external frame of the tire is changed as shown by a tire image T, when this critical load is exceeded. That is, not only the painting area of the tire is changed according to the load imposed on the tire, but also the frame, which has been black so far, is changed to a red frame when that load exceeds the critical load.

Specifically, in a case where a load in a forward direction exceeds the critical load of each tire due to a hard braking, the tire image drawing unit 402 draws a tire image in which the color of the external frame of the front tires FT and rear tires RT is changed to red, in the meter image, as shown in FIG. 12B.

Further, in a case where a load in a leftward direction exceeds the critical load of the tires (front and rear tires) on the left due to a sudden right turn during high velocity running, the tire image drawing unit 402 draws a tire image in which the color of the external frame of the front and rear tires lt on the left is changed to red (the color of the external frame of the front and rear tires rt on the right remains black), in the meter image, as shown in FIG. 12C.

That is, the tire image drawing unit 402 changes the color, etc. of the external frame of a tire concerned, in a case where the load imposed on that tire exceeds the critical load.

With this, it is possible to notify to the user that the tire grip has greatly dropped, etc.

Note that changing the color, etc. of the external frame of the tires is an example, and it is allowed to display in other display manners that the critical load of the tires is exceeded. For example, the very paint color of the tires may be changed to red, etc.

Further, other displays may be made before the critical load of the tires is exceeded, so that the user can be warned.

For example, when the load imposed on the tires becomes a value within a range of caution, which is lower than the critical load, the meter drawing unit 206 of the image creating device shown in FIG. 2 changes the external frame of the tires from black to thin red. Then, as the load gets closer to the critical load, the meter drawing unit 206 changes it from thin red to thick red.

With this, the user can run with reduced occurrence of tire slips, spins, etc., by operating the steering wheel or operating the brake so as not to turn the color of the external frame of the tires to red (thick red).

Further, instead of changing the color, etc. of the tires, the shape of the tires may be changed to visualize the load imposed on the tires.

Specifically, in a case where the load works in the forward direction (in case of decelerated running by braking, etc.), the meter drawing unit 206 of the image creating device shown in FIG. 2 draws a tire image in which the vertical width of the front tires FT is elongated (widened), in the meter image, as shown in FIG. 13A.

Further, in a case where the load works in the rightward direction (in case of constant velocity running while turning to the left, etc.), the meter drawing unit 206 draws a tire image in which the horizontal width of the front and rear tires lt on the left is shrunk (reduced) and the horizontal width of the front and rear tires rt on the right is elongated, in the meter image, as shown in FIG. 13B.

That is, the meter drawing unit 206 draws an image of tires whose vertical width or horizontal width is changed according to the load (direction and level) calculated by the load calculation unit 205, in the meter image.

With this, it is possible to appropriately visualize the load, etc. which occur along with the moving condition of a moving object, also from an image of tires whose shape is changed.

Further, in the above-described embodiment, a case that the load imposed on the virtual operator is visualized by the position of the head symbol H having an unchanging shape (circular shape) has been explained. However, the load imposed on the operator may be visualized by changing the shape of the head symbol H.

For example, the head symbol H may change its shape to a water drop, etc., which develops from the center (origin) of the circle S.

Specifically, in a case where the load works in the backward direction (in case of accelerated running, etc.), the meter drawing unit 206 of the image creating device shown in FIG. 2 draws a meter image in which the head symbol H is deformed from the center to the back like a water drop, as shown in FIG. 14A.

Further, in a case where the load works in the left-forward direction (in case of constantly decelerated running while turning to the right, etc.), the meter drawing unit 206 draws a meter image in which the head symbol H is deformed from the center to the left front like a water drop, as shown in FIG. 14B.

Also in this case, it is possible to appropriately visualize the load, etc. which occur along with the moving condition of a moving object.

Further, in the above-described embodiment, the explanation has been given by employing a virtual vehicle (racing car) running in a virtual space as an example. However, the invention can be applied, according to needs, to any object (virtual moving object) as long as it moves in a virtual space.

For example, a brief explanation will be given to a case where the operational objective is a virtual flying object (et plane, passenger plane, etc.) which flies in a virtual space.

In this case, the running condition managing unit 203 manages the moving condition of the virtual flying object moving in the virtual space, based on an operation input received. Note that the running condition managing unit 203 also manages moving conditions (running conditions) that are unique to flying objects, such as climbing turn condition and descending turn information, in addition to the information managed in FIGS. 3A and 3B described above.

Further, the image creating unit 204 creates a view field image observed by the virtual operator (pilot) from the craft, based on the stored image information and managed moving condition.

Meanwhile, the load calculation unit 205 calculates the load imposed on the virtual operator, based on the managed moving condition. For example, in a case where the managed moving condition is acceleration or deceleration, the load calculation unit 205 calculates the direction of the load imposed on the virtual operator, produced due to an inertia force, and the level of the load. Further, in a case where the managed moving condition is turning (including climbing turn and descending turn), the load calculation unit 205 calculates the direction of the load imposed on the virtual operator, produced due to a centrifugal force, and the level of the load.

Further, the meter drawing unit 206 creates a meter image as shown in FIGS. 5A to 5E described above, based on the load (direction and level) calculated by the load calculation unit 205. Note that instead of the tires in the diagrams, for example, the vertical tail rudder, etc. may be drawn.

Then, the display control unit 207 appropriately synthesizes the created view field image and the drawn meter image, and after this, converts the synthesized image into a predetermined image signal and displays the image on the external monitor or the like.

Specifically, in a case where the virtual flying object is turning to the left, a meter image in which the head symbol H is moved rightward from the origin is displayed together with view field image. Contrarily, in a case where the virtual flying object is turning to the right, a meter image in which the head symbol H is moved leftward from the origin is displayed together with the view field image.

Also in a case where the present invention is applied to a virtual flying object in this manner, a meter image in which the head symbol H is moved from the origin (in a corresponding direction by a corresponding distance) according to the load based on the running condition is displayed, and the user will feel the load imposed on the virtual operator from this meter image. As a result, it is possible to appropriately visualize the load, etc. which occur along with the moving condition of a moving object.

The present application claims priority based on Japanese Patent Application No 2004-262061, the content of which is incorporated herein in its entirety.

INDUSTRIAL APPLICABILITY

As explained above, according to the present invention, it is possible to provide an image creating device, a load display method, a recording medium, and a program which are suitable for appropriately visualizing a load, etc. which occur along with a moving condition of a moving object in a virtual space.

The invention claimed is:

1. An image creating device, comprising:
an operation input reception unit that receives an operation input for a virtual vehicle to be moved in a virtual space;
a view field image creating unit that creates a view field image seen from said virtual vehicle that runs in accordance with the received operation input
a load calculation unit that calculates a load imposed on said virtual vehicle based on a running condition of the vehicle;
a meter image creating unit that creates a meter image including a load symbol and an image of each of tires of the vehicle;
a display control unit that synthesizes the created view field image and the meter image and displays the synthesized image, wherein
said meter image creating unit includes:
a symbol drawing unit that draws a load symbol at a point away from a predetermined point of origin, in accordance with the calculated load; and
a tire image drawing unit that draws an image of a tire that corresponds to each of the tires of the virtual vehicle and whose display manner changes according to the calculated load.

2. An image creating device, comprising:
an image information storage unit that stores image information including a scenery image to be allocated in a virtual space;
an operation input reception unit that receives an operation input for a virtual vehicle to be moved in said virtual space;
a running condition managing unit that manages a running condition of said virtual vehicle based on the received operation input;
a load calculation unit that calculates a load imposed on said virtual vehicle, based on the managed running condition;
a view field image creating unit that creates a view field image seen from said virtual vehicle in accordance with the stored image information and the managed driving condition;
a meter image creating unit that creates a meter image including the drawn load symbol and image of the tire,
a display control unit that synthesizes the created view field image and the meter image and displays the synthesized image,
wherein
said meter image creating unit includes:
a symbol drawing unit that draws a load symbol, whose display position changes based on the calculated load at a point away from a predetermined point of origin, within a predetermined planar region; and
a tire image drawing unit that draws an image of a tire that corresponds to each of the four tires of the virtual vehicle and, whose display manner changes based on the calculated load.

3. The image creating device according to claim 1, wherein said tire image drawing unit draws an image of each of the tires, in such a way that a coloring area of a predetermined color of each of the tires varies according to the calculated load.

4. The image creating device according to claim 1, wherein said tire image drawing unit draws an image of each of the tires, in such a way that the shape of each of the tire varies according to the calculated load.

5. The image creating device according to claim 3, wherein said tire image drawing unit draws an image of each of the tires in which a color of an external frame of the image of each of the tires is further changed, in a case where the calculated load exceeds a predetermined critical load.

6. A load display method using an operation input reception unit, a view field image creating unit, a load calculating unit, a meter image creating unit and a display control unit, the load display method comprising:
an operation input receiving step of receiving an operation input for a virtual vehicle to be moved in a virtual space, the operation input receiving step being performed by said operation input reception unit;

a view field image creating step of creating a view field image seen from said virtual vehicle that runs in accordance with the received operation input, the view field image creating step being performed by said view field image creating unit;

a load calculating step of calculating a load imposed on said virtual vehicle based on a running condition of the vehicle, the load calculating step being performed by said load calculating unit;

a meter image creating step of creating a meter image including a load symbol and image of tires of the vehicle, the meter image creating step being performed by said meter image creating unit; and a display control step of synthesizing the created view field image and the meter image and displays the synthesized image, the display control step being performed by said display control unit;

wherein said meter image creating step includes:

a symbol drawing step of drawing a load symbol at a point away from a predetermined point of origin, in accordance with the calculated load; and, a tire image drawing step of drawing an image of a tire that corresponds to each of the tires of the virtual vehicle and whose display manner changes according to the calculated load.

7. An information recording medium storing a program for controlling a computer to function as:

an operation input reception unit that receives an operation input for a virtual vehicle to be moved in a virtual space;

a view field image creating unit that creates a view field image seen from said virtual vehicle that runs in accordance with the received operation input;

a load calculation unit that calculates a load imposed on said virtual vehicle based on a running condition;

a meter image creating unit that creates a meter image including a load symbol and image of tires of the vehicle; and a display control unit that synthesizes the created view field image and the meter image and displays the synthesized image, wherein said meter image creating unit controls the computer to draws a load symbol at a point away from a predetermined point of origin, in accordance with the calculated load; and draw an image of a tire that corresponds to each of the tires of the virtual vehicle and whose display manner changes according to the calculated load.

* * * * *